US008972510B2

(12) United States Patent
Christodorescu et al.

(10) Patent No.: US 8,972,510 B2
(45) Date of Patent: *Mar. 3, 2015

(54) METHOD AND APPARATUS FOR DETECTING UNAUTHORIZED BULK FORWARDING OF SENSITIVE DATA OVER A NETWORK

(75) Inventors: Mihai Christodorescu, Briarcliff Manor, NY (US); Josyula R. Rao, Briarcliff Manor, NY (US); Reiner Sailer, Scarsdale, NY (US); Douglas Lee Schales, Ardsley, NY (US)

(73) Assignee: International Business Machines Corporation, Armonk, NY (US)

( * ) Notice: Subject to any disclaimer, the term of this patent is extended or adjusted under 35 U.S.C. 154(b) by 74 days.

This patent is subject to a terminal disclaimer.

(21) Appl. No.: 13/604,093

(22) Filed: Sep. 5, 2012

(65) Prior Publication Data
US 2013/0332541 A1 Dec. 12, 2013

Related U.S. Application Data

(63) Continuation of application No. 13/494,101, filed on Jun. 12, 2012.

(51) Int. Cl.
*G06F 15/16* (2006.01)
(52) U.S. Cl.
USPC .......................................................... 709/206
(58) Field of Classification Search
CPC ...................................................... G06F 15/16
USPC ........................................................ 709/206
See application file for complete search history.

(56) References Cited

U.S. PATENT DOCUMENTS

| 6,928,465 | B2 | 8/2005 | Earnest | |
|---|---|---|---|---|
| 7,359,948 | B2 * | 4/2008 | Ralston et al. | 709/206 |
| 7,565,403 | B2 * | 7/2009 | Horvitz et al. | 709/206 |
| 7,590,697 | B2 * | 9/2009 | Ito et al. | 709/206 |
| 7,653,695 | B2 * | 1/2010 | Flury et al. | 709/206 |
| 7,730,137 | B1 | 6/2010 | Toomey | |
| 8,250,132 | B2 | 8/2012 | Adreon et al. | |
| 2002/0188689 | A1 | 12/2002 | Michael | |
| 2003/0172291 | A1 | 9/2003 | Judge et al. | |
| 2004/0177120 | A1 * | 9/2004 | Kirsch | 709/206 |
| 2005/0033810 | A1 | 2/2005 | Malcolm et al. | |
| 2005/0188028 | A1 * | 8/2005 | Brown et al. | 709/206 |
| 2005/0193145 | A1 | 9/2005 | Brown et al. | |

(Continued)

FOREIGN PATENT DOCUMENTS

GB 2390703 A * 1/2004 ............. G06F 1/00

*Primary Examiner* — Kostas Katsikis
(74) *Attorney, Agent, or Firm* — Ryan, Mason & Lewis, LLP

(57) ABSTRACT

Methods and apparatus are provided for detecting unauthorized bulk forwarding of sensitive data over a network. A bulk forwarding of email from a first network environment is automatically detected by determining an arrival rate for internal emails received from within the first network environment into one or more user accounts; determining a sending rate for external emails sent from the one or more user accounts to a second network environment; and detecting the bulk forwarding of email from a given user account by comparing the arrival rate for internal emails and the sending rate for external emails. The bulk forwarding of email from a given user account can be detected by determining whether statistical models of the arrival rate for internal emails and of the sending rate for external emails are correlated in time.

9 Claims, 4 Drawing Sheets

(56) References Cited

U.S. PATENT DOCUMENTS

| | | |
|---|---|---|
| 2006/0010215 A1 | 1/2006 | Clegg et al. |
| 2006/0010216 A1* | 1/2006 | Tsutsui .................. 709/206 |
| 2006/0075030 A1* | 4/2006 | van Riel .................. 709/206 |
| 2006/0195604 A1 | 8/2006 | Goodman et al. |
| 2006/0212572 A1* | 9/2006 | Afek et al. .................. 709/225 |
| 2006/0277259 A1 | 12/2006 | Murphy et al. |
| 2007/0143851 A1 | 6/2007 | Nicodemus et al. |
| 2008/0021961 A1* | 1/2008 | Jhawar .................. 709/206 |
| 2008/0162390 A1 | 7/2008 | Kapoor et al. |
| 2008/0225711 A1 | 9/2008 | Raszuk et al. |
| 2008/0250106 A1* | 10/2008 | Rugg et al. .................. 709/206 |
| 2009/0092050 A1 | 4/2009 | Buch et al. |
| 2009/0254971 A1 | 10/2009 | Herz et al. |
| 2009/0271373 A1 | 10/2009 | Mandel et al. |
| 2010/0023754 A1 | 1/2010 | Peled et al. |
| 2010/0091676 A1 | 4/2010 | Moran et al. |
| 2010/0161537 A1* | 6/2010 | Liu et al. .................. 706/46 |
| 2011/0083190 A1 | 4/2011 | Brown et al. |
| 2011/0149736 A1* | 6/2011 | Kashyap et al. .................. 370/235 |
| 2011/0173142 A1* | 7/2011 | Dasgupta et al. .................. 706/12 |
| 2011/0289162 A1 | 11/2011 | Furlong et al. |
| 2012/0110101 A1 | 5/2012 | Feistel et al. |
| 2012/0317269 A1* | 12/2012 | Weppler et al. .................. 709/224 |
| 2013/0007151 A1* | 1/2013 | Chen et al. .................. 709/206 |
| 2013/0212185 A1 | 8/2013 | Pasquero et al, |
| 2013/0329577 A1* | 12/2013 | Suzuki et al. .................. 370/252 |

\* cited by examiner

METHOD AND APPARATUS FOR DETECTING UNAUTHORIZED BULK FORWARDING OF SENSITIVE DATA OVER A NETWORK

CROSS-REFERENCE TO RELATED APPLICATIONS

This application is a continuation of U.S. patent application Ser. No. 13/494,101, filed Jun. 12, 2012, incorporated by reference herein.

FIELD OF THE INVENTION

The present invention relates to techniques for preventing electronic mail from being used to forward confidential and/or sensitive data.

BACKGROUND OF THE INVENTION

Electronic mail (email) is a method of exchanging digital messages between a sender and one or more recipients, typically over the Internet or other computer networks. In an enterprise environment, for example, email is known to provide a reliable and efficient method of communicating. There are a number of well recognized risks associated with enterprise email as well. For example, computer viruses can spread from one computer to another using email. In addition, email can be improperly used to forward confidential and/or sensitive data from a secure enterprise network to an external recipient. For example, the confidential and/or sensitive data can be included in the body of an email or as an email attachment.

A number of techniques have been proposed or suggested for preventing email from being used to forward confidential and/or sensitive data from a secure enterprise network to an external recipient. For example, many enterprise email systems include a filtering mechanism to scan outgoing emails for known confidential and/or sensitive data. While such existing filtering mechanisms have reduced the unauthorized transfers of confidential and/or sensitive data using email, there are many computers in an enterprise network that cannot be fully trusted. Thus, the filtering mechanisms installed on such computers cannot be relied on.

A need therefore remains for improved methods and apparatus for detecting unauthorized bulk forwarding of sensitive data over a network.

SUMMARY OF THE INVENTION

Generally, methods and apparatus are provided for detecting unauthorized bulk forwarding of sensitive data over a network. According to one aspect of the invention, a bulk forwarding of email from a first network environment is automatically detected by determining an arrival rate for internal emails received from within the first network environment into one or more user accounts; determining a sending rate for external emails sent from the one or more user accounts to a second network environment; and detecting the bulk forwarding of email from a given user account by comparing the arrival rate for internal emails and the sending rate for external emails.

The arrival rate for internal emails can be determined by obtaining a statistical model of the arriving internal emails. The sending rate for external emails can be determined by obtaining a statistical model of the sent internal emails. Furthermore, the determination of the sending rate for external emails can derive a sending rate for external emails sent from one or more computer systems connected to the first network environment and map the one or more user accounts to the one or more computer systems.

According to a further aspect of the invention, the bulk forwarding of email from a given user account can be detected by determining whether a statistical model of the arrival rate for internal emails and a statistical model of the sending rate for external emails are correlated in time. For example, the statistical models can be correlated in time based on an evaluation of one or more of timing, size, and content characteristics of the internal emails received from within the first network environment and the external emails sent front the one or more user accounts.

The statistical models optionally comprise a discrete distribution of message sizes over a time window. Generally, the statistical models measure similarity between a stream of the arriving internal emails and a stream of the sent external emails. A more complete understanding of the present invention, as well as further features and advantages of the present invention, will be obtained by reference to the following detailed description and drawings.

DETAILED DESCRIPTION OF PREFERRED EMBODIMENTS

The present invention provides methods and apparatus for detecting unauthorized bulk forwarding of confidential or sensitive data over a network by evaluating incoming and outgoing transfers for the computer systems over a network, such as an enterprise network. According to one aspect of the invention, unauthorized transfers are identified based on the similarity of the underlying incoming and outgoing transfers of a user. A first incoming transfer (such as an email) occurs from a trusted data repository server, such as an internal e-mail server, to a semi-trusted computer, such as an employee workstation, on an internal network. A second outgoing transfer (such as an email) occurs from the semi-trusted computer to an untrusted computer, such as an external e-mail server.

In one exemplary embodiment, a bulk email forwarding of internal e-mail by a user to an external e-mail account is identified if statistical models of the internal e-mail arrival rate and the external e-mail sending rate of a given user are correlated in time. For example, the similarity of two underlying transfers can be measured based on statistical similarities between the timing, size, and content characteristics of the two underlying transfers.

While the exemplary embodiments are illustrated using e-mail, the present invention can be applied to detect the unauthorized forwarding of any type of sensitive data using any form of communication, such as instant messaging, as would be apparent to aye/son of ordinary skill in the art.

Figure 1:
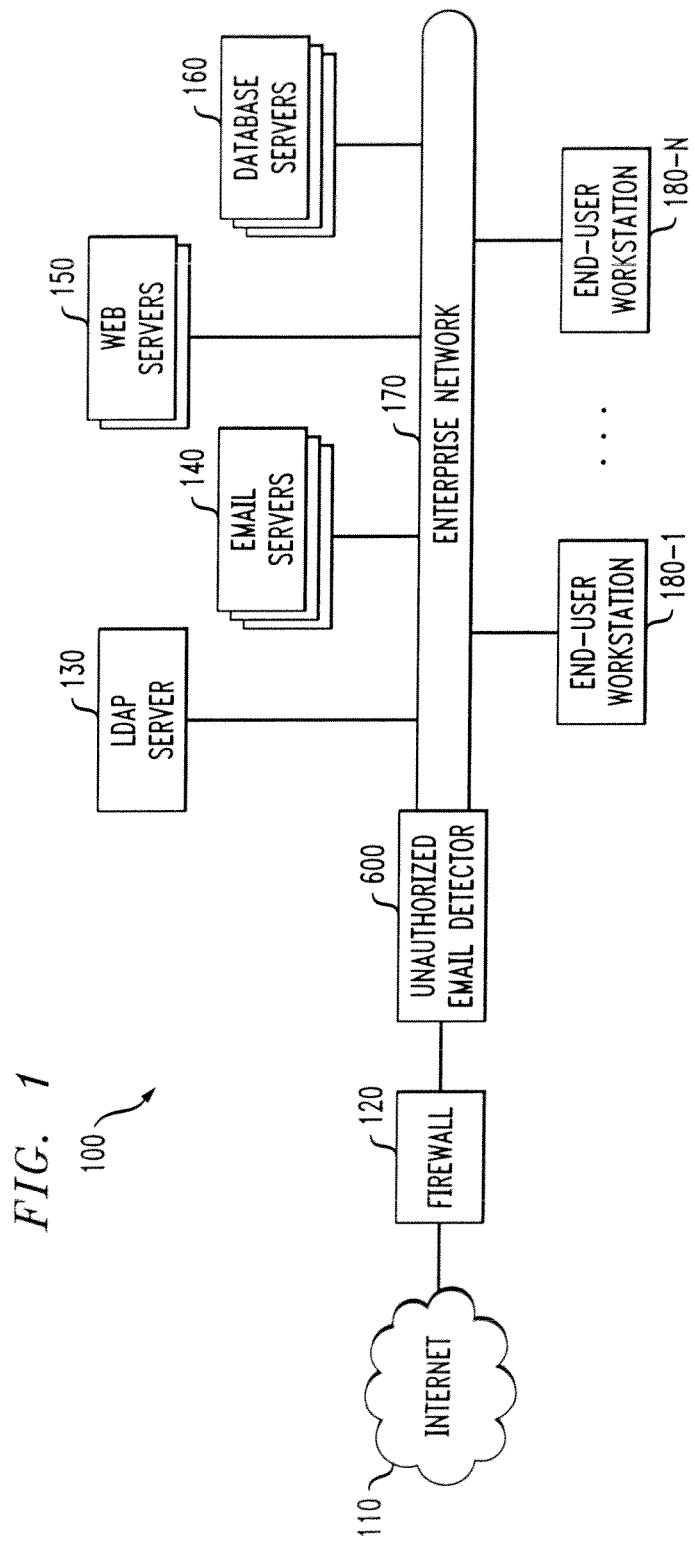
FIG. 1 illustrates an exemplary network environment in which the present invention can operate.

FIG. 1 illustrates an exemplary network environment 100 in which the present invention can operate. As shown in FIG. 1, one or more end-user workstations 180-1 through 180-N communicate over an enterprise network 170 with one another, and with an LDAP (Lightweight Directory Access Protocol) server 130, one or more email servers 140, one or more web servers 150 and one or more database servers 160, in a known manner. Generally, the LDAP server 130 provides access to distributed directory information services, in a known manner. In addition, the workstations 180 and servers 130, 140, 150, 160 can access the Internet 110 (or World Wide Web) via a security firewall 120, in a known manner.

According to one aspect of the present invention, an unauthorized email detector 600 automatically detects unauthorized bulk forwarding of confidential or sensitive data over the network 170. In the exemplary embodiment of FIG. 1, the unauthorized email detector 600 is positioned between the enterprise network 170 and the firewall 120. The processes associated with the unauthorized email detector 600 are discussed further below in conjunction with FIGS. 2 through 5. The system aspects of the unauthorized email detector 600 are discussed further below in conjunction with FIG. 6.

Figure 2:
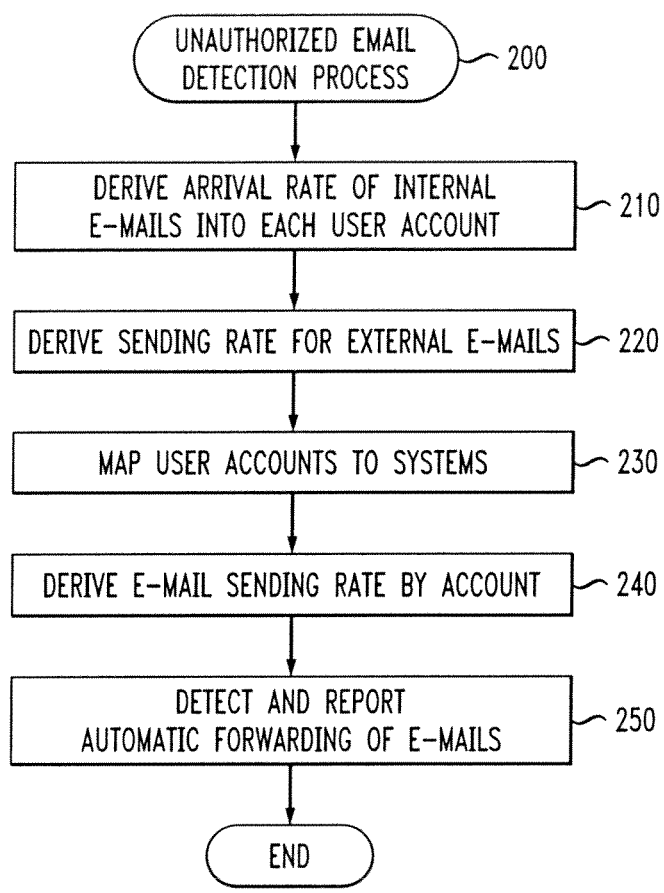
FIG. 2 is a flow chart describing an exemplary implementation of an unauthorized email detection process incorporating aspects of the present invention.

FIG. 2 is a flow chart describing an exemplary implementation of an unauthorized email detection process 200 incorporating aspects of the present invention. As shown in FIG. 2, the exemplary unauthorized email detection process 200 initially derives the arrival rate of internal e-mails into each user account during step 210, as discussed further below in conjunction with FIG. 3.

Thereafter, during step 220, the exemplary unauthorized email detection process 200 derives the sending rate for external e-mails from each internal system (e.g., workstations 180) on the enterprise network 170 to externally hosted e-mail servers, as discussed further below in conjunction with FIG. 4.

The user accounts associated with such internal systems are mapped to the corresponding internal systems during step 230. A list can be generated mapping user accounts to internal systems (e.g., workstations 180), such that it is possible to identify the particular user that was logged onto an internal system while each incoming or outgoing e-mail communication was observed. For example, the user mapping list can be generated by querying the authentication logs for each internal system, in order to determine which user was logged into each system at a given time. In a further variation, the user mapping list can be generated by monitoring authentication traffic from internal systems to an enterprise-wide authentication server (if available).

The e-mail sending rate is then derived during step 240 from each user account to externally hosted e-mail servers, as discussed further below in conjunction with FIG. 5.

Finally, the exemplary unauthorized email detection process 200 detects and reports automatic forwarding of e-mails during step 250.

For example, a bulk email forwarding of internal e-mail by a user to an external e-mail account can be identified during step 250 if statistical models of the internal e-mail arrival rate (from step 210) and the external e-mail sending rate of a given user (from step 240) are correlated in time. For example, the similarity of two underlying transfers can be measured based on statistical similarities between the timing, size, and content characteristics of the two underlying transfers.

In this manner, the exemplary unauthorized email detection process 200 analyzes the statistical model of step 210 (for the internal e-mail arrival rate by user account) and the statistical model of step 240 (for the external e-mail sending rate by user account). The statistical correlation determines whether the two models (from steps 210 and 240) are correlated over time. If the two models are correlated in time, then it is a strong indication that that user is forwarding his or her internal e-mail to an external e-mail account. In such cases, an alert can optionally be generated to allow a security analyst or system administrator to review the supporting information from the steps of the exemplary unauthorized email detection process 200 and to take any appropriate action.

Figure 3:
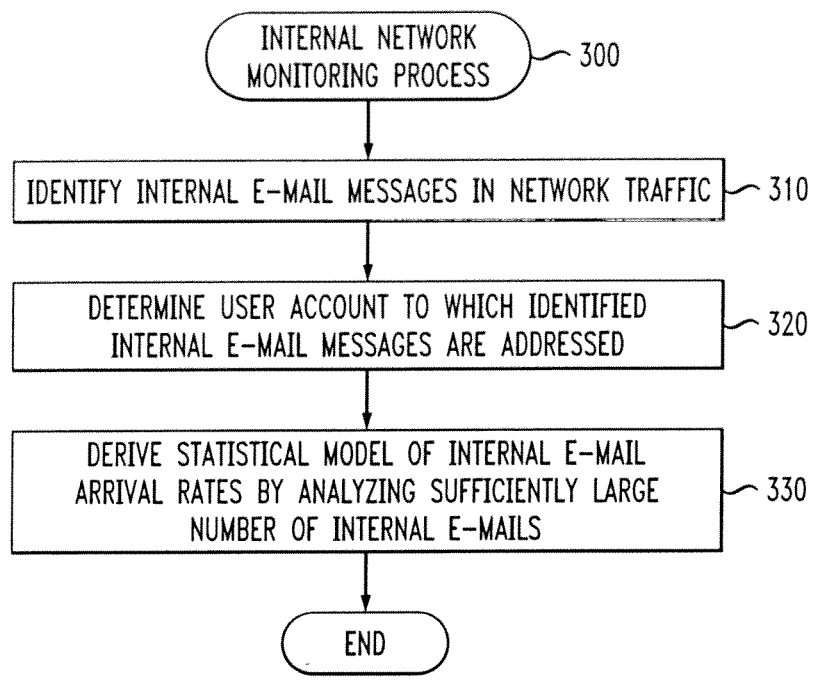
FIG. 3 is a flow chart describing an exemplary implementation of an internal network monitoring process incorporating aspects of the present invention.

FIG. 3 is a flow chart describing an exemplary implementation of an internal network monitoring process 300 incorporating aspects of the present invention. As shown in FIG. 3, the exemplary internal network monitoring process 300 initially identifies the internal e-mail messages among the network traffic during step 310. Thereafter, the internal network monitoring process 300 identifies the user account to which each identified internal e-mail message is addressed during step 320.

Finally, the internal network monitoring process 300 constructs a statistical model during step 330 of the internal e-mail arrival rates for each user account, e.g., by analyzing a sufficiently large number of internal e-mails. In a further variation of the internal network monitoring process 300, an internal mail server log (e.g., a log of a Lotus Domino server, or a Microsoft Exchange server) could be use to build the statistical model, in a known manner.

For example, a discrete distribution of message sizes over a time window can be used as an exemplary statistical model. Then, the incoming distribution and the outgoing distribution are compared for similarity using the Kullback-Leibler divergence. See, e.g., S. Kullback and R. A. Leibler. "On Information and Sufficiency," Ann. Math. Statist., Vol. 22, No. 1, 79-86 (1951), for a discussion of the Kullback-Leibler divergence. More generally, the selected statistical model(s) should measure similarity between the stream of incoming messages and the stream of outgoing messages.

Figure 4:
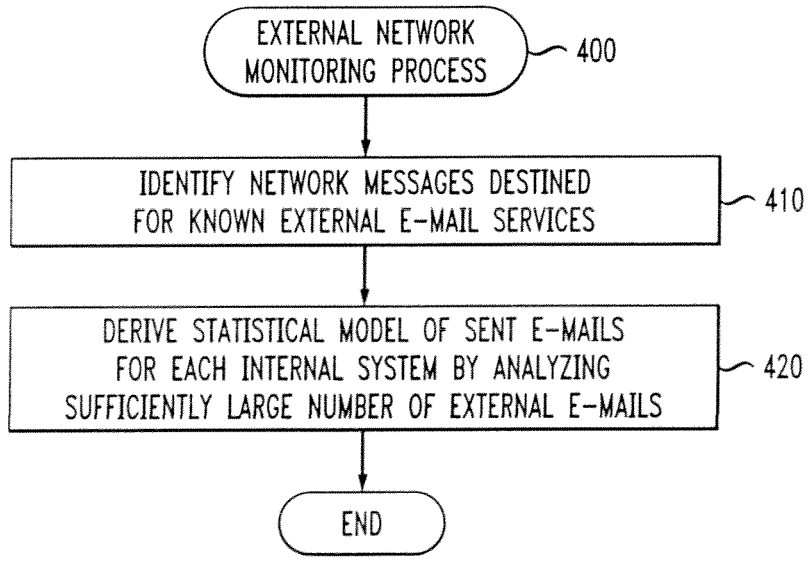
FIG. 4 is a flow chart describing an exemplary implementation of an external network monitoring process incorporating aspects of the present invention.

FIG. 4 is a flow chart describing an exemplary implementation of an external network monitoring process 400 incorporating aspects of the present invention. As shown in FIG. 4, the exemplary external network monitoring process 400 initially identifies network messages destined for known external e-mail services (e.g., Google Mail, Hotmail, or Yahoo! Mail) during step 410. Thereafter, the exemplary external network monitoring process 400 derives a statistical model of sent e-mails for each internal system, e.g., by analyzing a sufficiently large number of external e-mails during step 420.

It is noted that when network messages carrying external e-mail are encrypted, it may not be possible to identify the user account that originated the e-mail. Thus, the similarity is computed in the aggregate.

Figure 5:
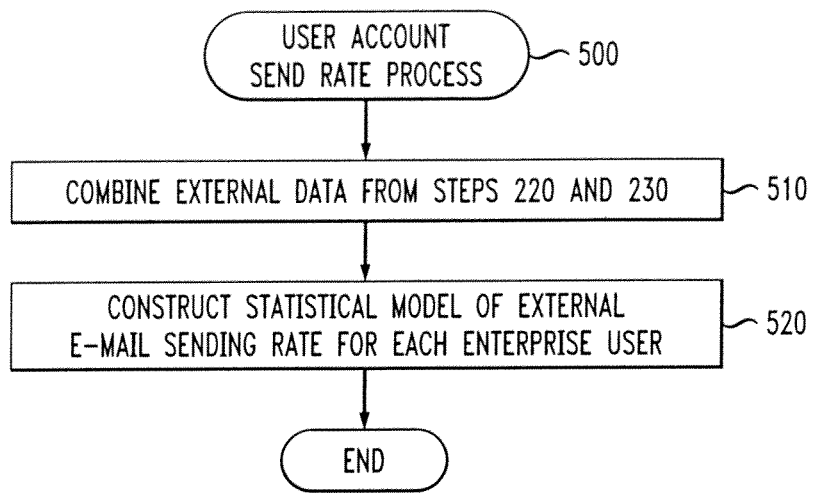
FIG. 5 is a flow chart describing an exemplary implementation of a user account send rate process incorporating aspects of the present invention.

FIG. 5 is a flow chart describing an exemplary implementation of a user account send rate process 500 incorporating aspects of the present invention. As shown in FIG. 5, the exemplary user account send rate process 500 initially combines the data from steps 220 and 230 during step 510, and then constructs a statistical model of the external e-mail sending rate for each enterprise user during step 520.

By combining the data of steps 220 and 230, the exemplary user account send rate process 500 constructs a statistical model of the external e-mail sending rate for each enterprise user. In many cases, the construction of a statistical model is a straightforward look-up operation to identify the user that was logged onto a given system, and then to associate the system's statistical model of sending rates with that of the logged on user.

In the case when users often change workstations during their normal work flow, however, then a system's statistical model of external e-mail sending rates is a combination of multiple's users' statistical models. In such a scenario, the invention uses the login details for each user (including the login and the logout times) to identify the relevant parts of the statistical model and create a composite model for that user from multiple system models. Note that the names of the internal user account and the external e-mail account can be distinct.

While FIGS. 2 through 5 show exemplary sequences of steps, it is also an embodiment of the present invention that these sequences may be varied. Various permutations of the algorithms are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

As will be appreciated by one skilled in the art, aspects of the present invention may be embodied as a system, method or computer program product. Accordingly, aspects of the present invention may take the form of an entirely hardware Embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
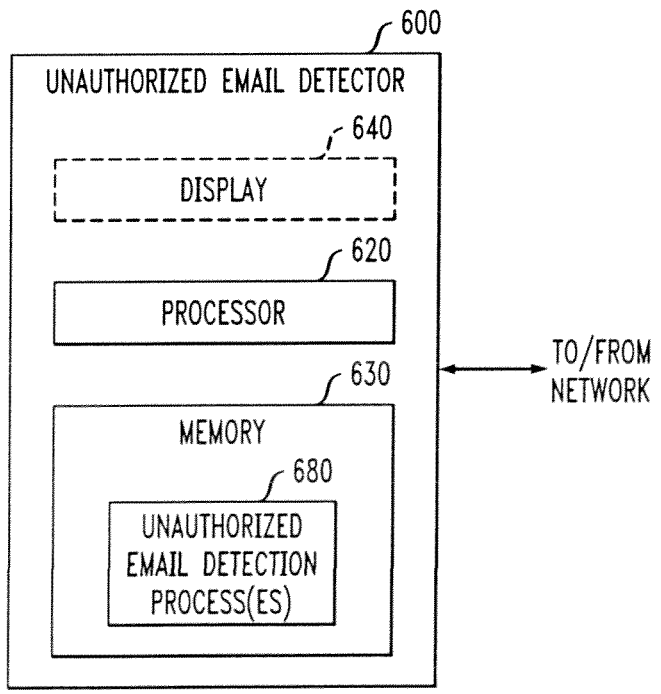
FIG. 6 is a block diagram of an unauthorized email detector that can implement the processes of the present invention.

FIG. 6 is a block diagram of an unauthorized email detector 600 that can implement the processes of the present invention. As shown in FIG. 6, memory 630 configures the processor 620 to implement the robot navigation and equipment classification methods, steps, and functions disclosed herein (collectively, shown as 680 in FIG. 6). The memory 630 could be distributed or local and the processor 620 could be distributed or singular. The memory 630 could be implemented as an electrical, magnetic or optical memory, or any combination of these or other types of storage devices. It should be noted that each distributed processor that makes up processor 620 generally contains its own addressable memory space. It should also be noted that some or all of computer system 600 can be incorporated into a personal computer, laptop computer, handheld computing device, application-specific circuit or general-use integrated circuit.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the embodiments and variations shown and described herein are merely illustrative of the principles of this invention and that various modifications may be implemented by those skilled in the art without departing from the scope and spirit of the invention.

What is claimed is:

1. A method for automatically detecting bulk forwarding of email from a first network environment, comprising:

determining an arrival rate for internal emails received from within said first network environment into one or more user accounts within said first network environment;

determining a sending rate for external emails sent from said one or more user accounts to a second network environment; and detecting said bulk forwarding of email from a given one of said user accounts by comparing said arrival rate for said internal emails and said sending rate for said external emails.

2. The method of claim 1, wherein said step of determining said arrival rate for said internal emails further comprises the step of obtaining a statistical model of said arriving internal emails.

3. The method of claim 1, wherein said step of determining said sending rate for said external emails further comprises the step of obtaining a statistical model of said sent internal emails.

4. The method of claim 1, wherein said step of determining said sending rate for said external emails sent from said one or more user accounts further comprises the steps of deriving a sending rate for said external emails sent from one or more computer systems connected to said first network environment and mapping said one or more user accounts to said one or more computer systems.

5. The method of claim 1, wherein said step of detecting said bulk forwarding of email from said given one of said user accounts further comprises the step of determining whether a statistical model of said arrival rate for said internal emails and a statistical model of said sending rate for said external emails are correlated in time.

6. The method of claim 5, wherein said step of determining whether said statistical models are correlated in time comprises an evaluation of one or more of timing, size, and content characteristics of said internal emails received from within said first network environment and said external emails sent from said one or more user accounts.

7. The method of claim 5, wherein one or more of said statistical models comprise a discrete distribution of message sizes over a time window.

8. The method of claim 5, wherein one or more of said statistical models measure similarity between a stream of said arriving internal emails and a stream of said sent external emails.

9. The method of claim 1, further comprising the step of generating an alert for review.

* * * * *